US008910607B2

(12) United States Patent
Robinette et al.

(10) Patent No.: US 8,910,607 B2
(45) Date of Patent: Dec. 16, 2014

(54) METHOD AND MECHANISM CONFIGURED FOR REDUCING POWERTRAIN RIGID BODY MOTION DURING START/STOP

(75) Inventors: Darrell Lee Robinette, Fenton, MI (US); Michael S. Powell, Holt, MI (US)

(73) Assignee: GM Global Technology Operations LLC, Detroit, MI (US)

(*) Notice: Subject to any disclaimer, the term of this patent is extended or adjusted under 35 U.S.C. 154(b) by 945 days.

(21) Appl. No.: 13/048,963

(22) Filed: Mar. 16, 2011

(65) Prior Publication Data

US 2012/0234279 A1  Sep. 20, 2012

(51) Int. Cl.
| F02B 67/00 | (2006.01) |
| F02B 77/14 | (2006.01) |
| F02N 11/00 | (2006.01) |
| F16F 15/315 | (2006.01) |
| F02N 11/08 | (2006.01) |
| F02N 15/04 | (2006.01) |
| F16F 15/00 | (2006.01) |
| B60W 20/00 | (2006.01) |
| F16F 15/12 | (2006.01) |
| F16F 15/26 | (2006.01) |

(52) U.S. Cl.
CPC ............ *F02N 15/046* (2013.01); *F16F 15/315* (2013.01); *F02N 11/0851* (2013.01); *F16F 15/005* (2013.01); *B60W 20/00* (2013.01); *F16F 15/1207* (2013.01); *F16F 15/264* (2013.01); *F02D 2250/28* (2013.01)
USPC ................................... 123/179.25; 123/192.1

(58) Field of Classification Search
CPC .. B60W 20/00; F02D 2250/28; F16F 15/315; F16F 15/1207; F16F 15/005; F16F 15/264
USPC ................................ 123/179.3, 179.21, 192.1
See application file for complete search history.

(56) References Cited

U.S. PATENT DOCUMENTS

| 5,095,864 A | * | 3/1992 | Bolenz et al. ............... 123/179.1 |
| 6,694,938 B2 | * | 2/2004 | Vilou ........................... 123/179.3 |
| 6,868,815 B2 | * | 3/2005 | Carden ........................ 123/192.2 |
| 7,178,497 B2 | * | 2/2007 | Berger et al. ............... 123/192.1 |
| RE39,965 E | * | 1/2008 | Suzuki ........................ 123/179.3 |
| 2008/0276734 A1 | * | 11/2008 | Fulton ................................ 74/8 |
| 2012/0103293 A1 | * | 5/2012 | Robinette et al. ......... 123/179.25 |
| 2013/0167790 A1 | * | 7/2013 | Bradfield et al. ......... 123/179.25 |

FOREIGN PATENT DOCUMENTS

| CN | 1773102 A | 5/2006 |
| CN | 200975281 Y | 11/2007 |
| DE | 19951597 C1 | 3/2001 |
| DE | 102010016235 A1 | 10/2010 |
| WO | 2006006435 A1 | 1/2006 |
| WO | 2008071896 A2 | 6/2008 |

\* cited by examiner

*Primary Examiner* — Erick Solis
*Assistant Examiner* — Arnold Castro
(74) *Attorney, Agent, or Firm* — Quinn Law Group, PLLC

(57) ABSTRACT

A starting system for an engine of a vehicle includes a starter motor and a motion control mechanism. The starter motor includes a starter pinion gear configured to selectively mesh with a primary mass of the engine. The starter pinion gear is selectively rotatable about a first axis of rotation to cause the primary mass to rotate about a second axis of rotation. The motion control mechanism includes a mechanism pinion gear that is configured to selectively mesh with the primary mass of the engine. The mechanism pinion gear is configured to rotate about a third axis of rotation in response to rotation of the primary mass about the secondary axis of rotation.

16 Claims, 2 Drawing Sheets

METHOD AND MECHANISM CONFIGURED FOR REDUCING POWERTRAIN RIGID BODY MOTION DURING START/STOP

TECHNICAL FIELD

The invention generally relates to a method and mechanism configured for reducing powertrain rigid body motion during start/stop.

BACKGROUND

In a motor vehicle, the vehicle's engine, such as an internal combustion engine, is typically rotated via a starter to cause the engine to begin powering itself. A typical starter includes a pinion gear that is driven by an electric motor, and that is pushed out for engagement with a ring gear that is attached to the engine's flywheel or flex-plate, in order to start the engine.

In some vehicle applications, a stop-start system is employed, where the engine is automatically stopped or shut off to conserve fuel when vehicle propulsion is not required, and is then automatically re-started by a starter when vehicle drive is again requested. Such a stop-start system may be employed in a conventional vehicle having a single power plant, or in a hybrid vehicle application that includes both an internal combustion engine and a motor/generator for powering the vehicle.

SUMMARY

A starting system for an engine of a vehicle includes a starter motor and a motion control mechanism. The starter motor includes a starter pinion gear configured to selectively mesh with a primary mass of the engine. The starter pinion gear is selectively rotatable about a first axis of rotation to cause the primary mass to rotate about a second axis of rotation. The motion control mechanism includes a mechanism pinion gear that is configured to selectively mesh with the primary mass of the engine. The mechanism pinion gear is configured to rotate about a third axis of rotation in response to rotation of the primary mass about the secondary axis of rotation.

A method of starting an engine of a vehicle includes meshing a starter pinion gear of a starter motor with a primary mass of the engine. The pinion gear is rotated about a first axis of rotation to induce rotation of the primary mass about a second axis of rotation. The mechanism pinion gear of a motion control mechanism is meshed with the primary mass. The mechanism pinion gear is configured to rotate about a third axis of rotation in response to the induced rotation of the primary mass about the second axis of rotation.

A vehicle includes an engine block, a primary mass, and a starting system. The primary mass is rotatably coupled to the engine block. The starting system is configured for starting the engine. The starting system includes a starter motor and a motion control mechanism. The starter motor is fixedly connected to the engine block. The starter motor includes a starter pinion gear that is configured to selectively mesh with the primary mass of the engine and is rotatable about a first axis of rotation to cause the primary mass of the engine to rotate about a second axis of rotation. The motion control mechanism is fixedly connected to the engine block. The motion control mechanism includes a mechanism pinion gear that is configured to selectively mesh with the primary mass of the engine. The mechanism pinion gear is configured to rotate about a third axis of rotation in response to rotation of the primary mass about the secondary axis of rotation.

The above features and advantages and other features and advantages of the present invention are readily apparent from the following detailed description of the best modes for carrying out the invention when taken in connection with the accompanying drawings.

DETAILED DESCRIPTION

Figure 1:
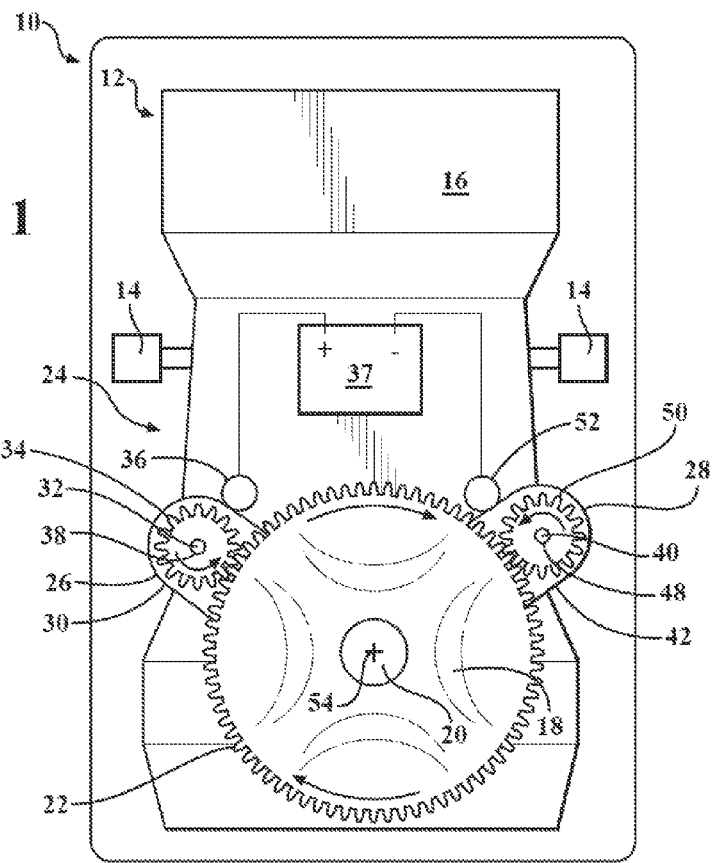
FIG. 1 is a schematic side view of a vehicle including an engine, a starter motor, a motion control mechanism, and a primary mass.

Referring to the drawings, wherein like reference numbers refer to like components, FIG. 1 shows a schematic view of a motor vehicle 10 which includes an engine 12 equipped with a stop-start capability. The engine 12 is mounted or otherwise attached to the vehicle 10 with one or more powertrain mounts 14. The engine 12 may be employed as part of a conventional powertrain, where the engine 12 is configured as the vehicle's 10 prime mover. The engine 12 may also be employed as part of a hybrid-electric type vehicle 10 powertrain, where the engine 12 is operated as part of a system with one or more motors/generators (not shown) for powering the vehicle 10.

The engine 12 includes an engine block 16 and a primary mass 18, e.g., a flex plate, flywheel, dual mass flywheel (DMF), and the like. The primary mass 18 is attached to a crankshaft 20 that extends within the engine block 16, and rotates at the same speed as the engine 12. The primary mass 18 includes a ring gear 22 having a specific gear tooth profile and spacing that is arranged along an outer perimeter. The ring gear 22 typically has an outer diameter that is designed to facilitate effective starting of the engine 12.

The engine 12 further includes a starting system 24 that is configured to start the engine 12. The starting system 24 includes a starter motor 26 and a motion control mechanism 28.

The starter motor 26 is arranged relative to the engine 12 in close proximity to the ring gear 22 for starting the engine 12. The starter may be fixedly connected directly to the engine 12, e.g., the engine block 16, to reduce the effect of manufacturing tolerances, as shown in FIG. 1. The starter motor 26 includes a starter stationary member, which is shown as a starter housing 30. The starter housing 30 accommodates the internal workings of the starter motor 26. The starter motor 26 includes an electric motor (not shown) that is employed to rotate a starter center shaft 32.

The starter motor 26 also includes a starter pinion gear 34 and a starter solenoid 36. The electric motor is activated by the motor solenoid (not shown), an electrical connection, a suitable lever arrangement (not shown), and the like, in order to rotate the starter center shaft 32. The motor solenoid receives electrical power from an energy storage device 37, such as a battery, that activates the motor. The starter solenoid 36 is configured to displace the starter pinion gear 34 into meshed engagement with the ring gear 22 of the primary mass 18, in order to start the engine 12.

Therefore, the starter pinion gear 34 is selectively rotatable about a first axis of rotation 38 and the starter pinion gear 34 is configured to selectively mesh with, and unmesh from, (i.e., engage and disengage) the ring gear 22 of the primary mass 18 of the engine 12. The rotation of the starter pinion gear 34 about the first axis of rotation 38 causes the primary mass 18 of the engine 12 to rotate about a second axis of rotation 40. Rotation of the primary mass 18 about the second axis of rotation 40 causes the engine 12 to start.

The motion control mechanism 28 is configured to reduce powertrain structure and crankshaft 20 oscillations during auto restart events for engines 12 using a conventional starter motor 26 to perform start/sop at vehicle 10 idle (i.e., 12 volt start/stop). The motion control mechanism 28 is arranged relative to the engine 12 (e.g., the engine block 16) in close proximity to the ring gear 22 of the primary mass 18. The motion control mechanism 28 includes a mechanism stationary member, which is shown as a mechanism housing 42. The mechanism housing 42 accommodates the internal workings of the motion control mechanism 28, which include a planetary gear set 44, an inertia mass 46, and a mechanism center shaft 48 that rotates to selectively cause rotation of the inertia mass 46, as explained in more detail below.

The motion control mechanism 28 also includes a mechanism pinion gear 50 and a mechanism solenoid 52. The mechanism solenoid 52 receives electrical power from the energy device. The mechanism solenoid 52 is configured to displace the mechanism pinion gear 50 into meshed engagement with the ring gear 22 of the primary mass 18, such that the mechanism pinion is caused to rotate about a third axis of rotation 54 in response to rotation of the primary mass 18 about the second axis of rotation 40. Therefore, the mechanism pinion gear 50 is configured to selectively mesh with the ring gear 22 of the primary mass 18. Likewise, the mechanism pinion gear 50 is configured to selectively unmesh from the ring gear 22 of the primary mass 18.

Figure 2:
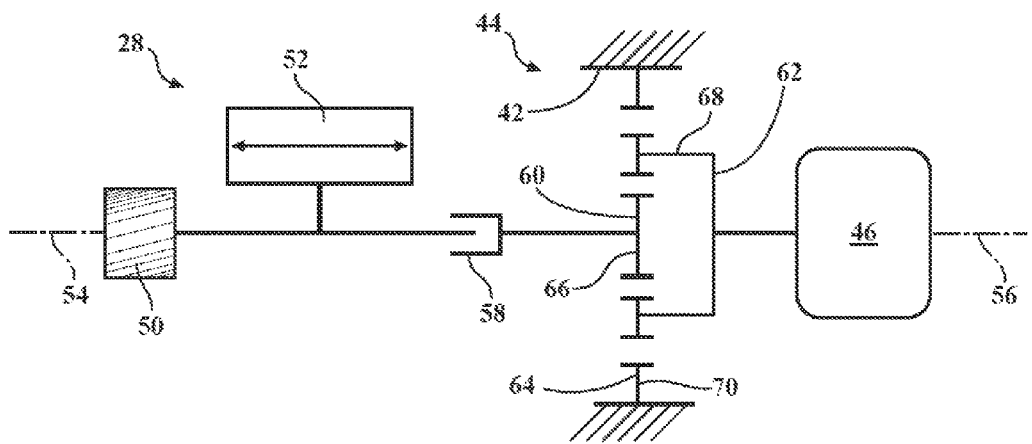
FIG. 2 is a schematic diagrammatic view of the motion control mechanism of FIG. 1.

As discussed above, the motion control mechanism 28 includes the inertia mass 46 configured to damp vibrations emanating from within the engine 12. The inertia mass 46 is a rotational damper that is configured to rotate about a fourth axis of rotation 56. The motion control mechanism 28 also includes a clutch 58 that may be operatively disposed between the mechanism pinion gear 50 and the inertia mass 46. More specifically, in the embodiment shown in FIG. 2, the clutch 58 is operatively disposed along the third axis of rotation 54 between the mechanism pinion gear 50 and the planetary gear set 44. The clutch 58 may be an electromechanical lockup clutch 58. However, other types of clutches 58 may be used. The inertia mass 46 is configured to be coupled to, and decoupled from, the mechanism pinion gear 50 in response to the respective engagement and disengagement of the clutch 58. Accordingly, the inertia mass 46 is caused to rotate about the fourth axis of rotation 56 only when the clutch 58 is engaged, at which time the inertia mass 46 is rotatably coupled to the mechanism pinion gear 50, i.e., the fourth axis of rotation 56 is coupled to the third axis of rotation 54. In the embodiment shown in FIG. 2, the third axis of rotation 54 and the fourth axis of rotation 56 are collinear.

Referring again to FIG. 2, the planetary gear set 44 of the motion control mechanism 28 is operatively disposed between the inertia mass 46 and the mechanism pinion gear 50. Rotation of the mechanism pinion gear 50 about the third axis of rotation 54 is transferred to the inertia mass 46 via the planetary gear set 44. The planetary gear set 44 includes a first operating member 60, a second operating member 62, and a third operating member 64. The first operating member 60 is configured to receive torque from the mechanism pinion gear 50. The second operating member 62 is configured to be fixedly connected to the engine 12 and/or the mechanism housing 42. The third operating member 64 is configured to output a reduced rotational speed to the inertia mass 46 from the rotational speed of the mechanism pinion gear 50 by virtue of operation of the first and second operating members 62.

The planetary gear set 44 is a simple planetary gear set 44 that includes a sun gear 66, a planet carrier 68, and a planetary ring gear 70. The sun gear 66 is the first operating member 60, the ring gear 22 is the second operating member 62, and the planet carrier 68 is the third operating member 64.

Figure 3:
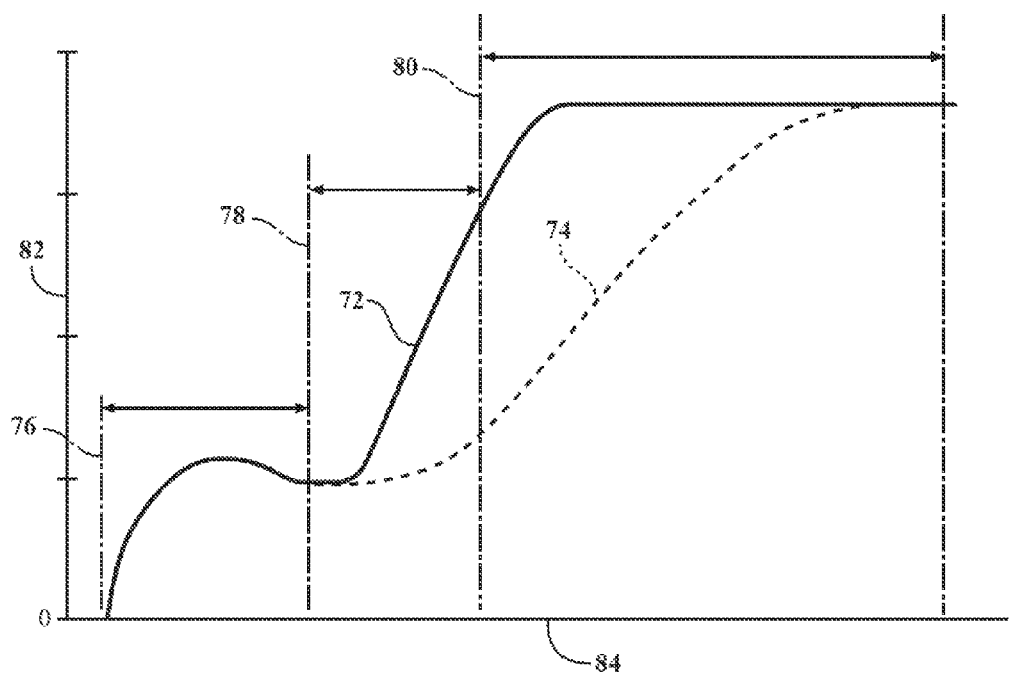
FIG. 3 is a graphical representation illustrating an engine speed profile of a vehicle having only a starter motor and the vehicle having a starter motor in combination with the motion control mechanism.

In operation, the starter pinion gear 34 of the starter motor 26 is meshed with the ring gear 22 of the primary mass 18. The starter pinion gear 34 is rotated about the first axis of rotation 38 to induce rotation of the primary mass 18 about the second axis of rotation 40. The mechanism pinion gear 50 of the motion control mechanism 28 is also meshed with the ring gear 22 of the primary mass 18. Referring to FIG. 3, the starter pinion gear 34 and the mechanism pinion gear 50 are both meshed with the ring gear 22 of the primary mass 18, at the time the starter motor 26 begins rotating the starter pinion gear 34 about the first axis of rotation 38, as indicated at 76 in FIG. 3. The mechanism pinion gear 50 is rotated about the third axis of rotation 54 in response to the induced rotation of the primary mass 18 about the second axis of rotation 40. At this time, the inertia mass 46 is decoupled from the mechanism pinion gear 50.

At a specified time, right before initial firing (combustion), the clutch 58 is activated and engaged, as indicated at 78 in FIG. 3. This means that inertia mass 46 is applied to the mechanism pinion gear 50 to damp angular vibrations emanating from within the engine 12. More specifically, the inertia mass 46 is applied to the mechanism pinion gear 50 by coupling the inertia mass 46 from the mechanism pinion gear 50. The inertia mass 46 only damps angular vibrations emanating from within the engine 12 when the inertia mass 46 is coupled with the mechanism pinion gear 50. Applying an inertia mass 46 may include activating the clutch 58 to couple the inertia mass 46 with the mechanism pinion gear 50. As discussed previously, the clutch 58 may be the electromechanical clutch 58. As the clutch 58 is activated and engaged at 78 in FIG. 3, the starter motor 26 is no longer rotating the starter pinion gear 34, such that the starter pinion gear 34 is disengaged from the ring gear 22.

The engine 12 is fired after activating the clutch 58. Therefore, the inertia mass 46 is coupled to the mechanism pinion gear 50 during the initial engine 12 firing and the subsequent ramp to engine 12 idle, as illustrated in FIG. 3. The inertia provided by the inertia mass 46 becomes very significant when reflected to the engine 12 crankshaft 20 through the planetary gear set 44 and a gear ratio of the mechanism pinion gear 50 and the ring gear 22 via the primary mass 18. Coupling the inertia mass 46 to the mechanism pinion gear 50 results in large reflected inertia imposed on the crankshaft 20. The added inertia slows down the speed ramp of the engine 12. This means that the motion control mechanism 28, by virtue of the inertia mass 46, acts like an additional primary mass 18, lowering combustion induced crankshaft 20 angular vibrations, resulting in lower forces transmitted to the powertrain mounts 14 and overall reduction in forces imposed upon the vehicle 10 during an auto start of the engine 12. Additionally, for vehicles 10 equipped with DMF's the angular displacement of the secondary mass is reduced. Once normal engine operation is achieved, as indicated at 80 in FIG. 3, the mechanism pinion gear 50 is disengaged from the ring gear 22.

Referring again to FIG. 3, the graph represents a mean engine speed 82, represented in revolutions per minute (RPM), versus time 84, represented in seconds (s). The solid line 72 illustrates a typical mean engine speed profile for vehicles 10 equipped with only a starter motor 26. Likewise, the dashed line 74 illustrates a typical mean engine speed profile for vehicles 10 equipped with both the starter motor 26 and the motion control mechanism 28. To enable low noise, vibration, harshness (NVH), forces transmitted from the powertrain to the vehicle 10, including the engine 12, need to be reduced in the second speed ranges of known sensitivities (i.e., driveline and rigid body powertrain mounts 14 modes). The motion control mechanism 28 is configured to reduce forces produced by the powertrain and imposed upon the vehicle 10 through the powertrain mounts 14 as engine 12 speed is ramped during initial firing (combustion).

Once the engine 12 achieves a first engine speed 76, e.g., a steady state idle speed, or slightly before, the clutch 58 is disengaged, decoupling the inertia mass 46 from the mechanism pinion gear 50, and the mechanism pinion gear 50 is extracted from, or unmeshed from, the ring gear 22 of the primary mass 18 via the mechanism solenoid 52. Therefore, the clutch 58 is deactivated to decouple the inertia mass 46 from the mechanism pinion gear 50 when the engine 12 reaches the first engine speed 76.

The starter solenoid 36 is unmeshed from, or otherwise decoupled from, the ring gear 22 of the primary mass 18 when the engine 12 reaches a second engine speed 78. The second engine speed 78 is greater than the first engine speed 76.

Additionally, the motion control mechanism 28 may be used during auto stops to reduce crankshaft 20 oscillations and powertrain reaction torque to improve the subjective feel of the auto stop to vehicle 10 occupants.

While the best modes for carrying out the invention have been described in detail, those familiar with the art to which this invention relates will recognize various alternative designs and embodiments for practicing the invention within the scope of the appended claims.

The invention claimed is:

1. A starting system for an engine of a vehicle, the starting system comprising:
    a starter motor including a starter pinion gear configured to selectively mesh with a primary mass of the engine, wherein the starter pinion gear is selectively rotatable about a first axis of rotation to cause the primary mass to rotate about a second axis of rotation; and
    a motion control mechanism including:
        a mechanism pinion gear configured to selectively mesh with the primary mass of the engine;
        wherein the mechanism pinion gear is configured to rotate about a third axis of rotation in response to rotation of the primary mass about the secondary axis of rotation; and
        a clutch operatively disposed along the third axis of rotation between the mechanism pinion gear and the inertia mass;
        wherein the clutch is configured to selectively couple and decouple the inertia mass from the mechanism pinion gear.

2. A starting system, as set forth in claim 1, wherein the motion control mechanism includes an inertia mass configured for damping angular vibrations emanating from within the engine.

3. A starting system, as set forth in claim 2, wherein the inertia mass is configured to be coupled to and decoupled from the mechanism pinion gear such that the inertia mass is caused to rotate about a fourth axis of rotation only when the fourth axis of rotation is coupled to the third axis of rotation.

4. A starting system, as set forth in claim 1, wherein the clutch is an electromechanical lockup clutch.

5. A starting system, as set forth in claim 3, wherein the third axis of rotation and the fourth axis of rotation are collinear.

6. A starting system, as set forth in claim 1, wherein the motion control mechanism includes a planetary gear set operatively disposed between the inertia mass and the mechanism pinion gear, wherein rotation of the mechanism pinion gear about the third axis of rotation is transferred to the inertia mass.

7. A starting system, as set forth in claim 6, wherein the planetary gear set includes:
    a first operating member configured to receive torque from the starter pinion gear;
    a second operating member configured to be fixedly connected to the engine; and
    a third operating member configured to output a reduced rotational speed to the inertia mass by operations of the first and second operating members.

8. A starting system, as set forth in claim 7, wherein the planetary gear set is a simple planetary gear set including a sun gear, a planet carrier, and a ring gear;
    wherein the sun gear is the first operating member, the ring gear is the second operating member, and the planet carrier is the third operating member.

9. A starting system, as set forth in claim 1, wherein the motion control mechanism further includes a solenoid configured to selectively move the mechanism pinion gear into and out of meshing relationship with the primary mass.

10. A method of starting an engine of a vehicle, the method comprising:
    meshing a starter pinion gear of a starter motor with a primary mass of the engine;
    rotating the pinion gear about a first axis of rotation to induce rotation of the primary mass about a second axis of rotation;
    meshing a mechanism pinion gear of a motion control mechanism with the primary mass;
    applying an inertia mass to the mechanism pinion gear to damp angular vibrations emanating from within the engine;
    wherein the mechanism pinion gear is configured to rotate about a third axis of rotation in response to the induced rotation of the primary mass about the second axis of rotation such that the inertia mass is caused to rotate about a fourth axis of rotation.

11. A method, as set forth in claim 10, wherein applying an inertia mass is further defined as coupling the inertia mass with the mechanism pinion gear;
    wherein the inertia mass only damps angular vibrations emanating from within the engine when the inertia mass is coupled with the mechanism pinion gear.

12. A method, as set forth in claim 11, wherein applying an inertia mass is further defined as activating a clutch to couple the inertia mass with the mechanism pinion gear.

13. A method, as set forth in claim 12, further comprising firing the engine after activating the clutch.

14. A method, as set forth in claim 13, further comprising deactivating the clutch to decouple the inertia mass from the mechanism pinion gear at a first engine speed.

15. A method, as set forth in claim 14, further comprising:
    unmeshing the mechanism solenoid from the primary mass at the first engine speed; and
    unmeshing the starter solenoid from the primary mass at the second engine speed;

wherein the second engine speed is greater than the first engine speed.

16. A vehicle comprising:
an engine block;
a primary mass rotatably coupled to the engine block;
a starting system configured for starting the engine, the starting system including:
  a starter motor fixedly connected to the engine block, the starter motor having a starter pinion gear configured to selectively mesh with the primary mass of the engine and rotatable about a first axis of rotation to cause the primary mass of the engine to rotate about a second axis of rotation; and
  a motion control mechanism fixedly connected to the engine block, the motion control mechanism having;
    a mechanism pinion gear configured to selectively mesh with the primary mass of the engine; and
    an inertia mass configured for damping angular vibrations emanating from within the engine;
    wherein the mechanism pinion gear is configured to rotate about a third axis of rotation in response to rotation of the primary mass about the secondary axis of rotation; and
    wherein the inertia mass rotates about a fourth axis of rotation in response to rotation of the mechanism pinion gear about the third axis of rotation.

* * * * *